(12) United States Patent
Li (10) Patent No.: US 8,257,807 B2
(45) Date of Patent: Sep. 4, 2012

(54) DOUBLE-LAYER CONTAINER AND METHOD FOR MAKING THE SAME

(75) Inventor: Kun-Yi Li, Tainan (TW)

(73) Assignee: Immanuel Industrial Co, Ltd, Tainan (TW)

( * ) Notice: Subject to any disclaimer, the term of this patent is extended or adjusted under 35 U.S.C. 154(b) by 399 days.

(21) Appl. No.: 12/633,056

(22) Filed: Dec. 8, 2009

(65) Prior Publication Data

US 2011/0091670 A1   Apr. 21, 2011

(30) Foreign Application Priority Data

Oct. 19, 2009   (TW) ................................ 98135238 A (51) Int. Cl.
  *B32B 1/08*   (2006.01)
  *A41G 1/00*   (2006.01)
  *B65D 90/08*   (2006.01)
(52) U.S. Cl. ........................ 428/34.1; 428/24; 220/62.14
(58) Field of Classification Search .................. 220/663, 220/62.11, 62.12, 62.13, 62.14, 62.15, 62.22; 206/457, 459.5; 264/259, 261, 262, 273, 274; 428/24, 34.1
See application file for complete search history.

(56) References Cited

U.S. PATENT DOCUMENTS

| | | | |
|---|---|---|---|
| 2,127,043 A * | 8/1938 | Most | ............................. 264/274 |
| 6,264,132 B1 | 7/2001 | Menz et al. | |
| 6,341,712 B1 * | 1/2002 | Huang | ........................... 220/663 |
| 6,349,841 B1 * | 2/2002 | Basara | ....................... 220/62.12 |
| 6,763,962 B1 | 7/2004 | Wang | |
| 2007/0278226 A1 * | 12/2007 | Li | ............................. 220/62.22 |

* cited by examiner

*Primary Examiner* — Rena Dye
*Assistant Examiner* — Susan R Dye
(74) *Attorney, Agent, or Firm* — Muncy, Geissler, Olds & Lowe, PLLC (57) ABSTRACT

A double-layer container includes an outer layer and an inner layer, both of which are formed by molding. The outer layer includes a 3-D pattern. The 3-D pattern has at least two pattern units each having at least one first groove which communicates with at least one through hole. The through hole is defined through the outer layer. At least one first slot is defined between the pattern units. The inner layer is fixed to an inner surface of the outer layer and the material of the inner layer is filled in the first groove via the through hole to form a first decoration portion.

10 Claims, 8 Drawing Sheets

DOUBLE-LAYER CONTAINER AND METHOD FOR MAKING THE SAME

FIELD OF THE INVENTION

The present invention relates to a double-layer container and a method for making the same, and more particularly, to a container wherein the inner layer is cooperated with the shape of the outer layer to disclose 3-D patterns of desired colors on the outside of the container.

BACKGROUND OF THE INVENTION

A conventional double-layer container discloses a double-layer container with an inner layer on which decoration plates are attached and the decoration plates are located at distances. The conventional double-layer container includes at least one slot defined through the outer layer and the at least one slot is filled by a filling which forms a 3-D pattern protruding from the surface of the outer layer. The conventional method is able to make a double-layer container that includes spiral decoration plates or sections of decoration plates.

However the spiral decoration plates or sections of decoration plates are on the inner layer of the container, which means that dirt or foreign objects are easily accumulated at the connection portions between the inner layer and the decoration plates and fungus is found at the connection portions.

Figure 7:
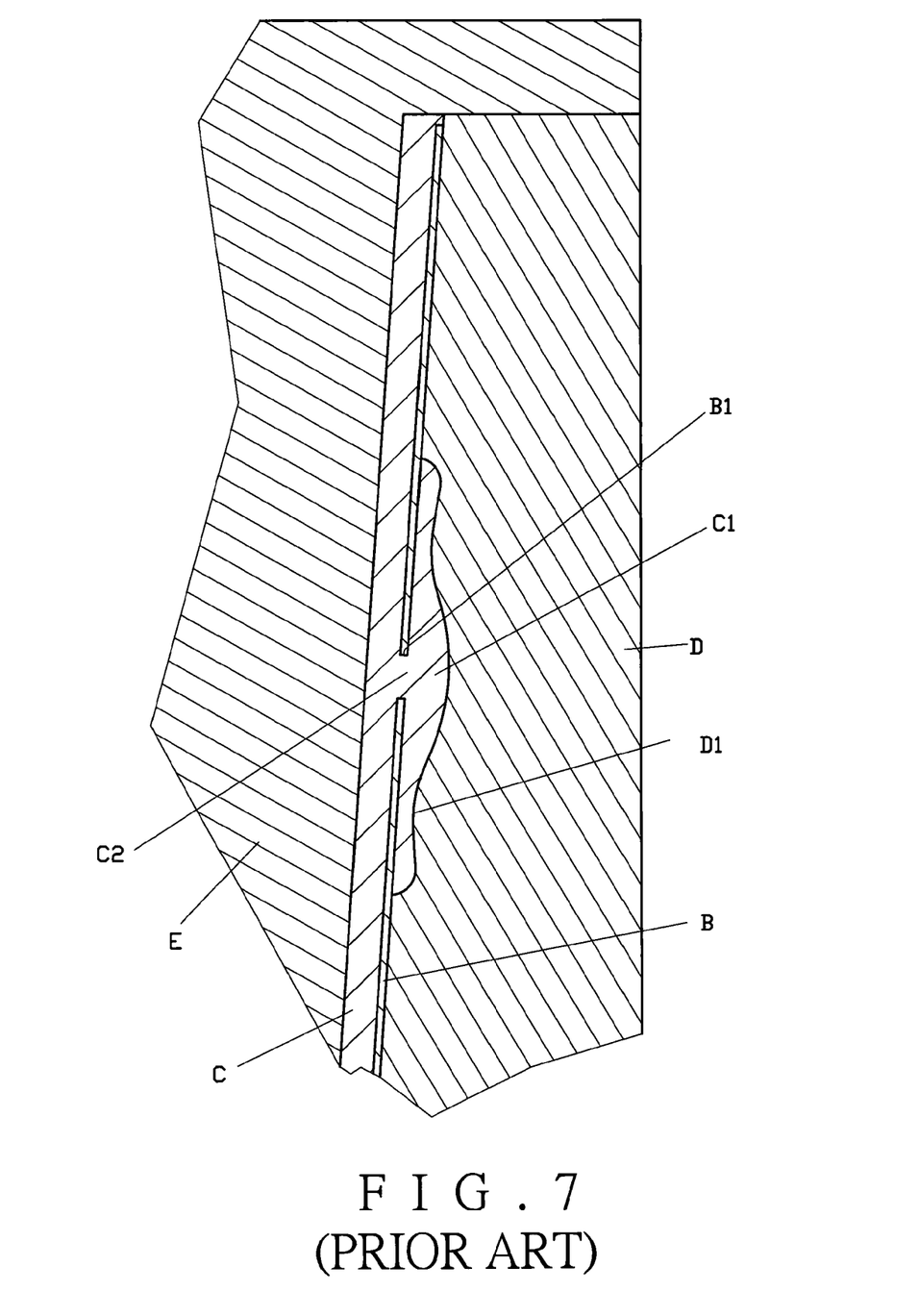
FIG. 7 is a cross sectional view to show that the inner layer is poured in the mold of a conventional container.
Figure 8:
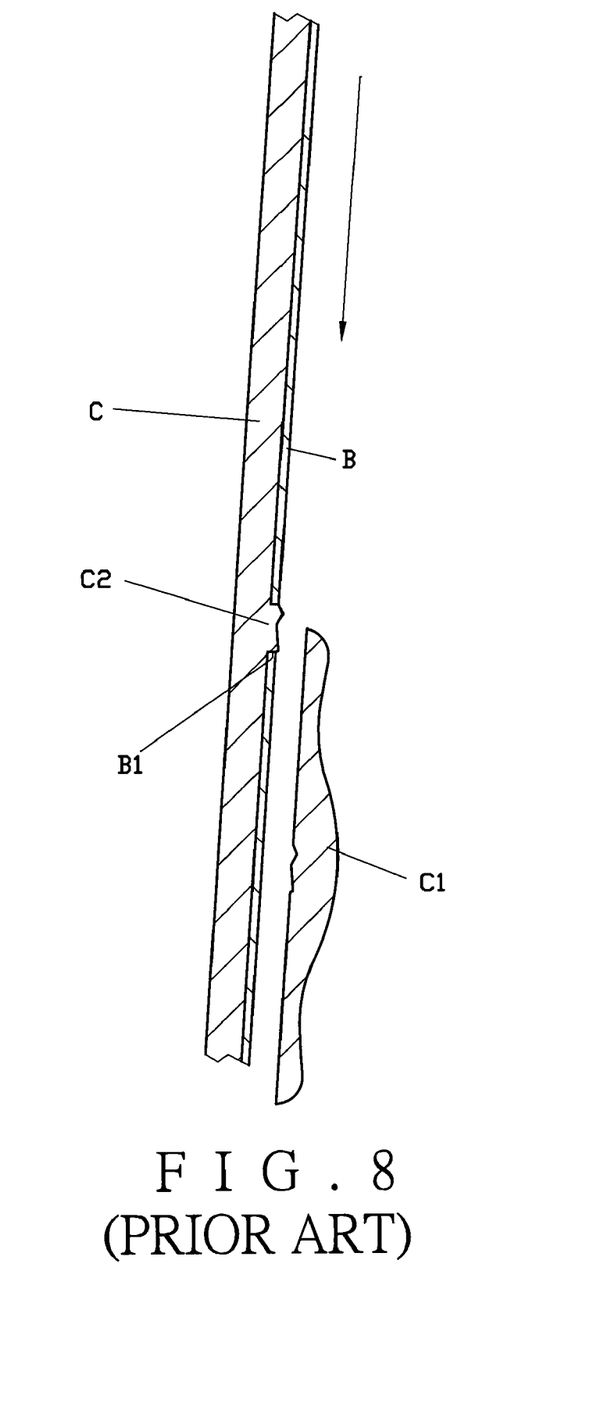
FIG. 8 shows that the 3-D pattern of the conventional container is damaged by a vertical force.

U.S. Pat. No. 6,763,962 discloses a container with double layers and is shown in FIGS. 7 and 8, wherein the container includes an inner layer C which includes a portion protruding from the surface of an outer layer B via a hole B1 in the outer layer B, such that the portion seals the hole B1 and covers the periphery of the hole B1. By this way, the inner layer C and the outer layer B are combined to each other and the inner and outer layers are not separated from each other by impact.

As shown in FIG. 7, the prior art discloses the hole B1 defined through the outer layer B and the inner layer C is poured between an outer mold member D and an inner mold E. The outer mold member D has a cavity D1 corresponding to the hole B1 of the outer layer B and a 3-D pattern C1 is formed in the cavity D1. The 3-D pattern C1 extends outward from the hole B1 to seal and cover the hole B1. The profile of the 3-D pattern C1 is the same as the shape of the inner surface of the cavity D1 so that the 3-D pattern C1 protrudes out from the surface of the outer layer B.

However, as shown in FIG. 8, the 3-D pattern C1 is connected to the outer surface of the outer layer by a connection portion C2 which is easily broken when a vertical force or load is applied to the outer layer B. Besides, the outer layer B includes a smooth surface and the multiple 3-D patterns C1 are individually disposed on the outer layer and cannot perform desired aesthetic profile.

U.S. Pat. No. 6,264,132 discloses a box-like container with an interpenetrating structure and process for realization thereof, wherein the container includes an integral outer layer with notches or holes and plastic material is poured to form an inner layer which includes portions having a thickness that is located corresponding to the notches or the holes so as to fill the notches and the holes to form a smooth surface on the outer layer. The notches or the holes and the portions include tapered surfaces so as to firmly connect the inner layer to the outer layer, such that the inner layer does not separate from the outer layer by forces applied to the container.

The applicant invented the prior art and combines different materials and/or colors to the container so as to produce a unique container that is different from the conventional containers in appearance. The portions that fill the holes or notches are smooth and flush with the outer surface of the outer layer so that the portions are not separated from the container. However, the thickness of the portions of the prior art is substantially identical to the thickness of the sum of the thickness of the inner and outer layers such that the container lacks 3-D patterns.

SUMMARY OF THE INVENTION

According to a first aspect of the present invention, there is provided a double-layer container comprising:

an outer layer having a 3-D pattern formed thereto and the 3-D pattern having at least two pattern units, the pattern units each having at least one first groove which communicates with at least one through hole, the at least one through hole defined through the outer layer, at least one first slot defined between the pattern units, and an inner layer fixed to an inner surface of the outer layer and including one portion extending in the at least one first groove via the at least one through hole to form a first decoration portion.

Preferably, the 3-D pattern of the outer layer includes multiple second slots and the inner layer has other portions extending in the second slots to form second decoration portions.

Preferably, the second slots of the outer layer each include a first tapered surface and the second decoration portions of the inner layer each include a second tapered surface.

Preferably, the at least one first groove is a radial and curved groove.

Preferably, the at least one pattern unit includes a recess defined in an outer periphery thereof.

Preferably, the outer layer and the inner layer are non-transparent.

Preferably, the outer layer is non-transparent and the inner layer is transparent.

Preferably, the outer layer includes a second groove and a path defined in a bottom thereof.

Preferably, the 3-D pattern has a first surface and the first decoration portion has a second surface, the first surface and the second surface being even surfaces or uneven surfaces.

According to a second aspect of the present invention, there is provided a method for making a double-layer container, comprising:

a. forming an outer layer: making an outer layer by using a first mold unit and the outer layer having a 3-D pattern which is composed of multiple pattern units, the pattern units being separated by multiple first slots and each pattern unit including at least one first groove, the at least one first groove communicating with at least one through hole defined through the outer layer, multiple second slots defined in the outer layer and located corresponding to the 3-D pattern;

b. mounting the outer layer to a second mold unit: mounting the outer layer to a second mold unit and the second mold unit comprising a core portion, an outer mold member and a bottom mold member, the bottom mold member having a passage and the outer layer having a path defined in a bottom thereof, the outer mold member having cavities located corresponding to the pattern units and the cavities being shaped as the 3-D pattern, the outer mold member being matched with an outer surface of the outer layer, a gap defined between an inner surface of the outer layer and the core portion of the second mold unit, and c. forming an inner layer: a material being filled with the gap via the passage of the bottom mold member and the path of the bottom of the outer layer to form an inner layer, the material of the inner layer being filled in the at least one first groove to form a first decoration portion, the material of the inner layer being filled in each of the second slots to form a second decoration portion.

Preferably, the first slots separate the pattern units of the 3-D pattern.

Preferably, the first decoration portion and the second decoration portion are flush with the outer surface of the outer layer.

Preferably, the first decoration portion and the second decoration portion protrude beyond the outer surface of the outer layer.

Preferably, the bottom mold member includes a positioning portion and the outer layer includes a second groove defined in the bottom thereof, the positioning portion is engaged with the second groove.

The present invention includes the following advantages:

1. The 3-D patterns can be any desired shape and each pattern unit is sophisticated which is made by the engraving on the outer layer and the formation of the inner layer, both of which increase the level of aesthetic purposes. The colors of Acrylic and the sophisticated patterns enhance the value of beauty of the container of the present invention.

2. The material of the inner layer enters the first grooves to form the first decoration portions via the through holes and firmly connects the inner layer and the outer layer of the container. The two layers are not separated from each other by forces applied to the container. The first decoration portions and the second decoration portions are flush with the surface of the outer layer so that the two decoration portions are not damaged by the foreign forces.

3. The first grooves of the present invention are radial and curved grooves so that the first decoration portions are made to include radial and curved shapes to be formed within the first grooves. The height of the first decoration portions can be vary and may have different colors and transparency to have higher levels of art value.

4. The pattern units can be made as plants, animals, or even the abstract drawings, the patterns supply new life to the Acrylic and plastic products.

5. The second slots of the outer layer are filled by the material of the inner layer to form the second decoration portions which play a key role of the 3-D patterns.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

The double-layer container of the present invention comprises an outer layer 1 and an inner layer 2.

Figure 1:
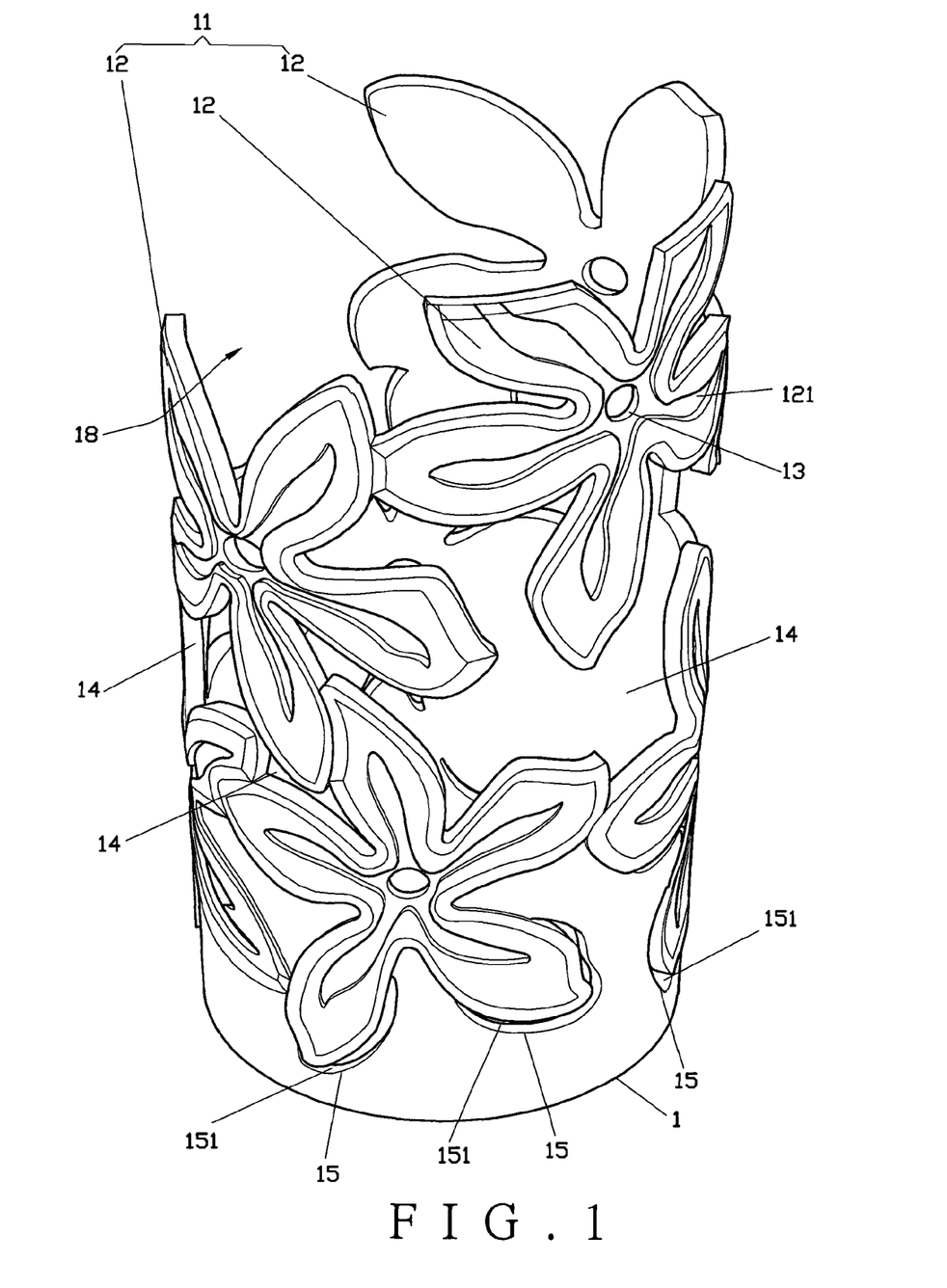
FIG. 1 is a perspective view to show the outer layer of the double-layer container of the present invention.
Figure 2:
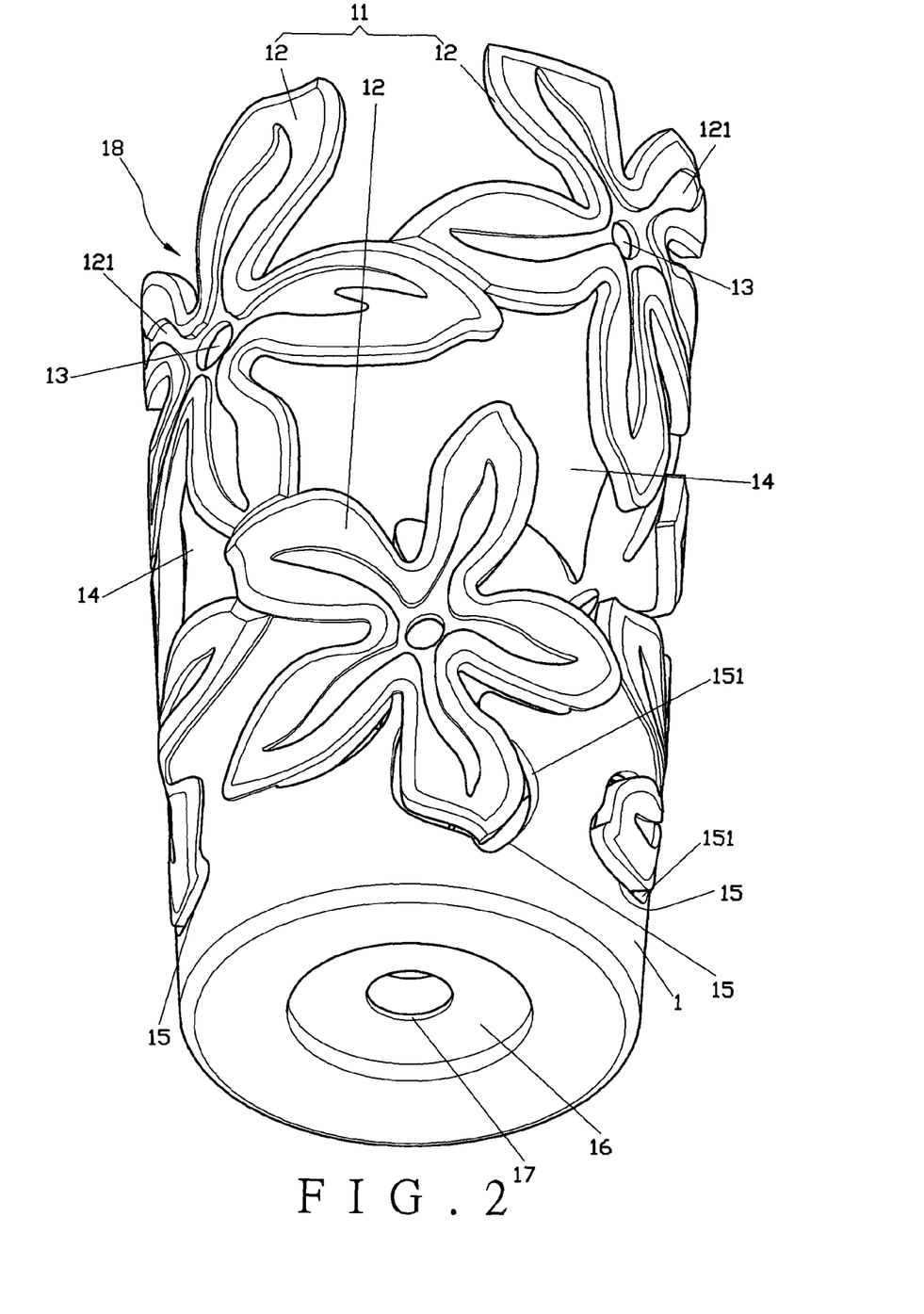
FIG. 2 is a perspective view, viewed from the bottom, of the outer layer of the double-layer container of the present invention.
Figure 4:
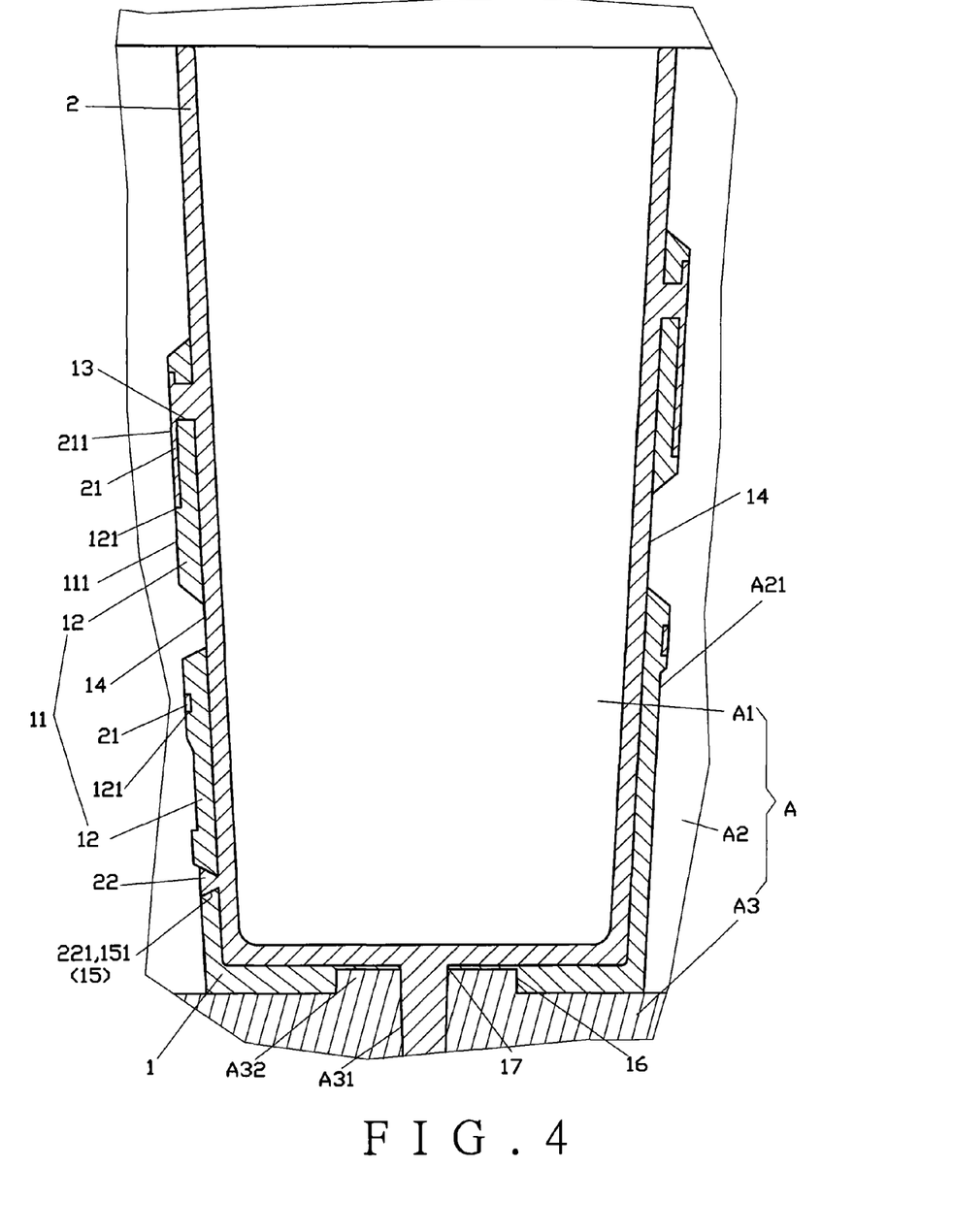
FIG. 4 is a cross sectional view to show that the second mold unit is connected with the outer layer and the material of the inner layer is poured in the second mold unit.
Figure 5:
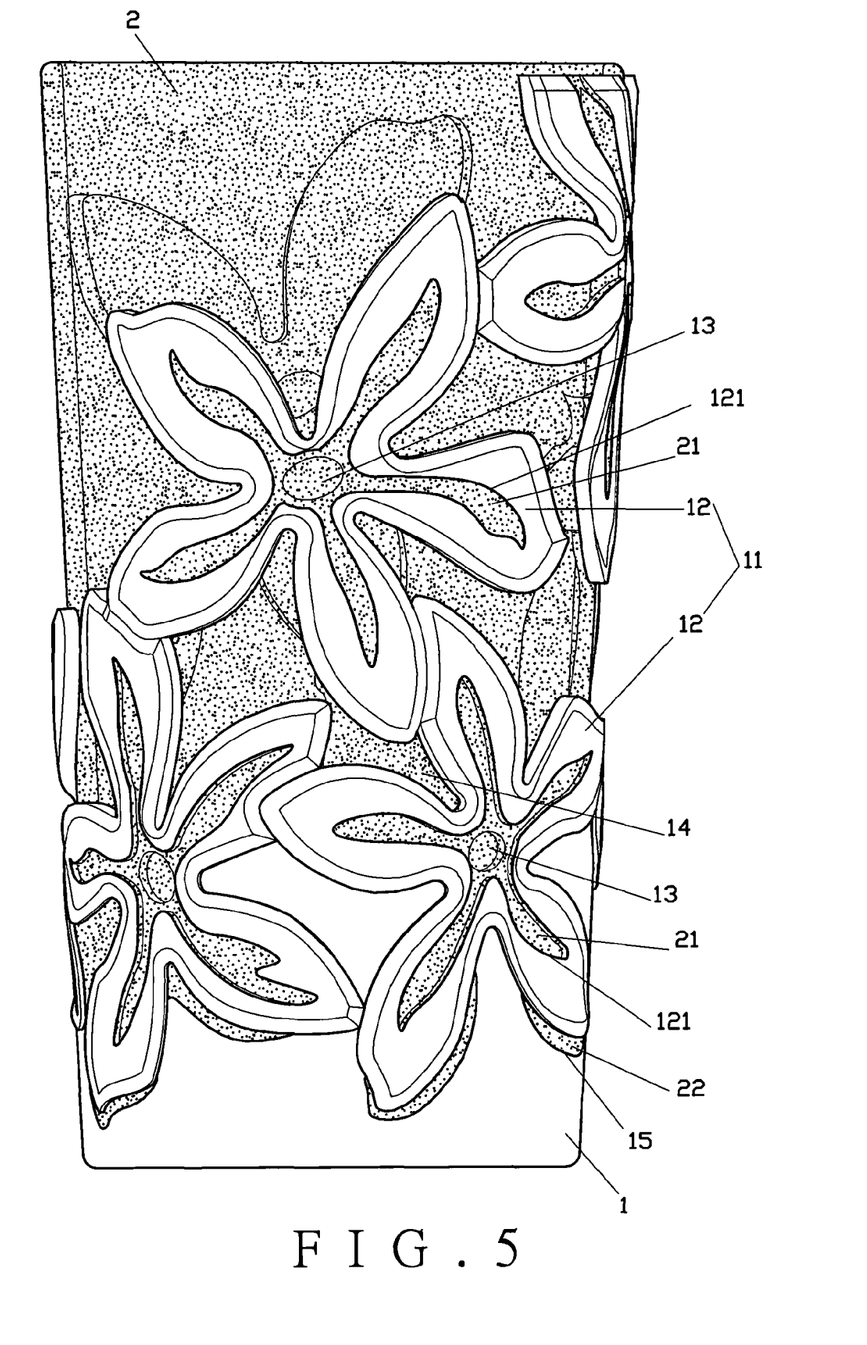
FIG. 5 shows that the outer layer of the container of the present invention is non-transparent and the inner layer of the present invention is transparent.

Referring to FIGS. 1 and 2, the outer layer 1 has a 3-D pattern 11 formed thereto. The 3-D pattern 11 has a first surface 111 which is an even surface, as shown in FIGS. 4 and 5. The 3-D pattern 11 includes at least two pattern units 12. Each pattern unit 12 has at least one first groove 121 which is a radial and curved groove and communicates with at least one through hole 13. The at least one through hole 13 is defined through the outer layer 1. At least one first slot 14 is defined between the pattern units 12. The 3-D pattern 11 of the outer layer 1 includes multiple second slots 15. The outer layer 1 includes a second groove 16 and a path 17 defined in a bottom thereof. The at least one pattern unit 12 includes a recess 18 defined in an outer periphery thereof. The recess 18 reduces the weight of the outer layer 1 and performs the 3-D nature.

Figure 3:
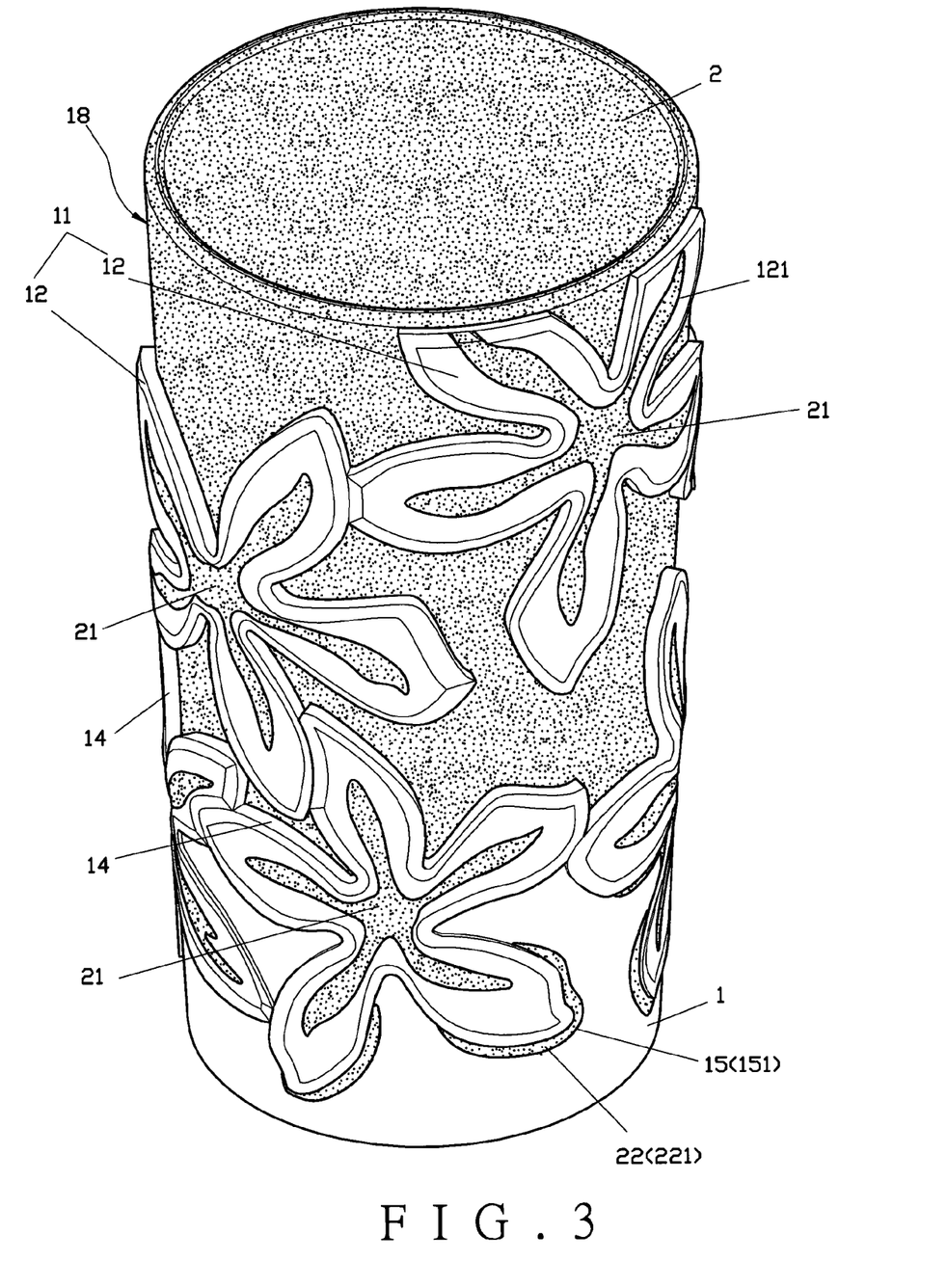
FIG. 3 is a perspective view to show that the outer layer is connected to the inner layer of the double-layer container of the present invention.

Referring to FIGS. 3 and 5, the inner layer 2 is a tubular body and fixed to an inner surface of the outer layer 1. The material of the inner layer 2 is filled in the at least one first groove 121 via the at least one through hole 13 to form a first decoration portion 21. The first decoration portion 21 has a second surface 211, as shown in FIG. 4. The at least one first groove 121 is a radial and curved groove and the first decoration portion 21 is radial and curved to match with the shape of the at least one first groove 121. The material of the inner layer 2 fills the second slots 15 to form second decoration portions 22. The shape of the through hole 13 is matched with the shape of the first decoration portion 21.

The second slots 15 of the outer layer 1 each include a first tapered surface 151 and the second decoration portions 22 of the inner layer 2 each include a second tapered surface 221, such that the second decoration portion 22 is engaged with the second slot 15.

Figure 6:
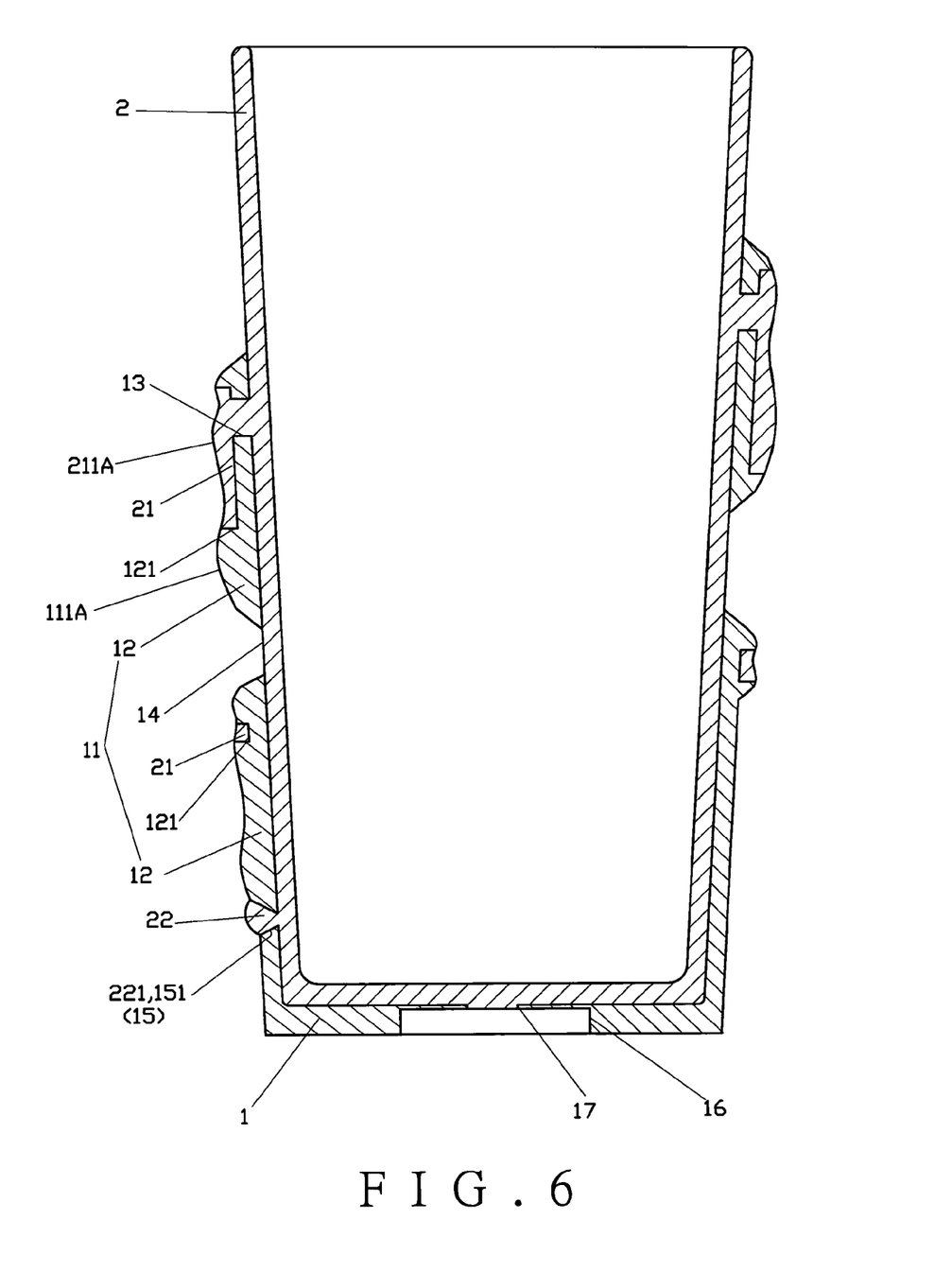
FIG. 6 shows that the surface of the 3-D pattern is an uneven surface.

FIG. 6 shows another embodiment of the present invention. The 3-D pattern 11 has a first surface 111A, and the first decoration portion 21 has a second surface 211A. The first and second surfaces 111A, 211A are uneven for providing an obvious 3-D vision.

Referring to FIGS. 1 to 4, the method for making the double-layer container includes the following steps:

a. forming an outer layer 1: making an outer layer 1 by using a first mold unit and the outer layer 1 having a 3-D pattern 11 which is composed of multiple pattern units 12, the pattern units 12 being separated by multiple first slots 14 which make the pattern units 12 to be distinguished, the pattern units 12 including at least one first groove 121, the at least one first groove 121 communicating with at least one through hole 13 defined through the outer layer 1, multiple second slots 15 defined in the outer layer 1 and located corresponding to the 3-D pattern 11;

b. mounting the outer layer 1 to a second mold unit "A": mounting the outer layer 1 to a second mold unit "A" and the second mold unit "A" comprising a core portion A1, an outer mold member "A2" and a bottom mold member "A3", the outer mold member "A2" can be composed of two, three or four parts so as to be easily removed from the container, the bottom mold member "A3" having a passage A31 and the outer layer 1 having a path 17 defined in a bottom thereof, the outer mold member A2 having cavities A21 located corresponding to the pattern units 12 and the cavities A21 being shaped as the 3-D pattern 11, the outer mold member A2 being matched with an outer surface of the outer layer 1, a gap defined between an inner surface of the outer layer 1 and the core portion A1 of the second mold unit A, and c. forming an inner layer 2: a material being filled with the gap via the passage A31 of the bottom mold member A3 and the path 17 of the bottom of the outer layer 1 to form the inner layer 2, the material of the inner layer 2 being filled in the at least one first groove 121 to form a first decoration portion 21, the material of the inner layer 2 being filled in each of the second slots 15 to form a second decoration portion 22.

The first decoration portion 21 and the second decoration portion 22 are flush with the outer surface of the outer layer 1, or protrude beyond the outer surface of the outer layer 1 to form the 3-D visual feature. The number or shape of the pattern units 12 and the second slots 15 can be varied according to practical needs to increase the aesthetic performance.

The bottom mold member A3 includes a positioning portion A32 and the outer layer 1 includes a second groove 16 defined in the bottom thereof. The positioning portion A32 is engaged with the second groove 16 so as to ensure that the passage A31 is precisely aligned with the path 17.

The first slots 14 separate the pattern units 12 to distinguish the area of each pattern unit 12. By this way, each pattern unit 12 is more distinguishable and the 3-D pattern 11 that is composed of the pattern units 12 is more real and attractive.

The outer layer 1 and the inner layer 2 can be non-transparent, or the outer layer 1 is non-transparent and the inner layer 2 is transparent. As shown in FIG. 5, the pattern units 12 and the first decoration portion 21 are composed to show a flower and the through hole 13 is located at the center of the flower. The first decoration portion 21 is transparent so that the shape of the through hole 13 can be seen and can be varied according to the shape of the first decoration portion 21. By the match of the different levels of the transparency of the outer layer 1 and the inner layer 2, the container made from the same second mold unit "A" have different visual appearances so that the containers made by the method of the present invention can have different visual appearances. The mold units used in the method of the present invention is much less expensive than the conventional mold units.

While we have shown and described the embodiment in accordance with the present invention, it should be clear to those skilled in the art that further embodiments may be made without departing from the scope of the present invention.

What is claimed is:

1. A double-layer container comprising:
an outer layer having a 3-D pattern formed thereto and the 3-D pattern having at least two pattern units, the pattern units each having at least one first groove which communicates with at least one through hole, the at least one through hole defined through the outer layer, at least one first slot defined between the pattern units, and
an inner layer fixed to an inner surface of the outer layer and including one portion extending in the at least one first groove via the at least one through hole to form a first decoration portion.

2. The container as claimed in claim 1, wherein the 3-D pattern of the outer layer includes multiple second slots and the inner layer has other portions extending in the second slots to form second decoration portions.

3. The container as claimed in claim 2, wherein the second slots of the outer layer each include a first tapered surface and the second decoration portions of the inner layer each include a second tapered surface.

4. The container as claimed in claim 1, wherein the at least one first groove is a radial and curved groove.

5. The container as claimed in claim 1, wherein the at least one pattern unit includes a recess defined in an outer periphery thereof.

6. The container as claimed in claim 1, wherein the outer layer and the inner layer are non-transparent.

7. The container as claimed in claim 1, wherein the outer layer is non-transparent and the inner layer is transparent.

8. The container as claimed in claim 1, wherein the outer layer includes a second groove and a path defined in a bottom thereof.

9. The container as claimed in claim 1, wherein the 3-D pattern has a first surface and the first decoration portion has a second surface, the first surface and the second surface being even surfaces.

10. The container as claimed in claim 1, wherein the 3-D pattern has a first surface and the first decoration portion has a second surface, the first surface and the second surface being uneven surfaces.

* * * * *